(No Model.) 3 Sheets—Sheet 1.

T. R. ALMOND.
COUPLING FOR SHAFTING.

No. 304,156. Patented Aug. 26, 1884.

Witnesses:
John C. Tunbridge
John M. Speer

Inventor:
Thos. R. Almond
by his attorneys
Briesen & Steele (No Model.) 3 Sheets—Sheet 2.
T. R. ALMOND.
COUPLING FOR SHAFTING.
No. 304,156. Patented Aug. 26, 1884.

Witnesses:
John C. Tunbridge
John M. Speer

Inventor
Thos. R. Almond
by his attorneys
Briesen & Steele (No Model.) 3 Sheets—Sheet 3.

T. R. ALMOND.
COUPLING FOR SHAFTING.

No. 304,156. Patented Aug. 26, 1884.

Witnesses:
John C. Tunbridge.
John M. Speer.

Inventor:
Thos. R. Almond
by his attorneys
Briesen & Steele

UNITED STATES PATENT OFFICE.

THOMAS R. ALMOND, OF NEW YORK, N. Y.

COUPLING FOR SHAFTING.

SPECIFICATION forming part of Letters Patent No. 304,156, dated August 26, 1884.

Application filed July 18, 1884. (No model.)

*To all whom it may concern:*

Be it known that I, THOMAS R. ALMOND, a resident of New York city, in the county and State of New York, have invented an Improved Coupling for Shafting, of which the following is a full, clear, and exact description, reference being made to the accompanying drawings, in which—

Figure 1:
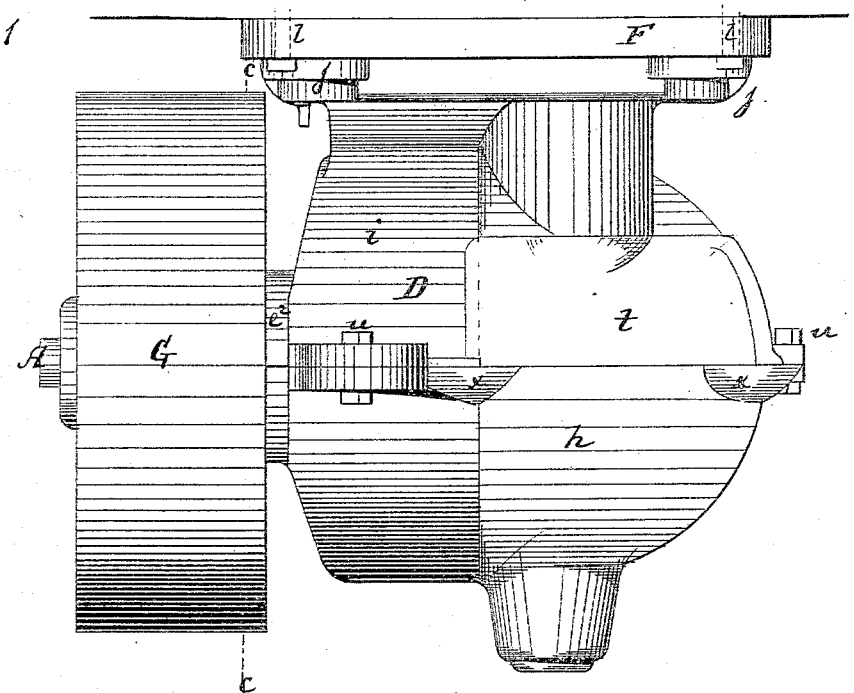
Figure 2:
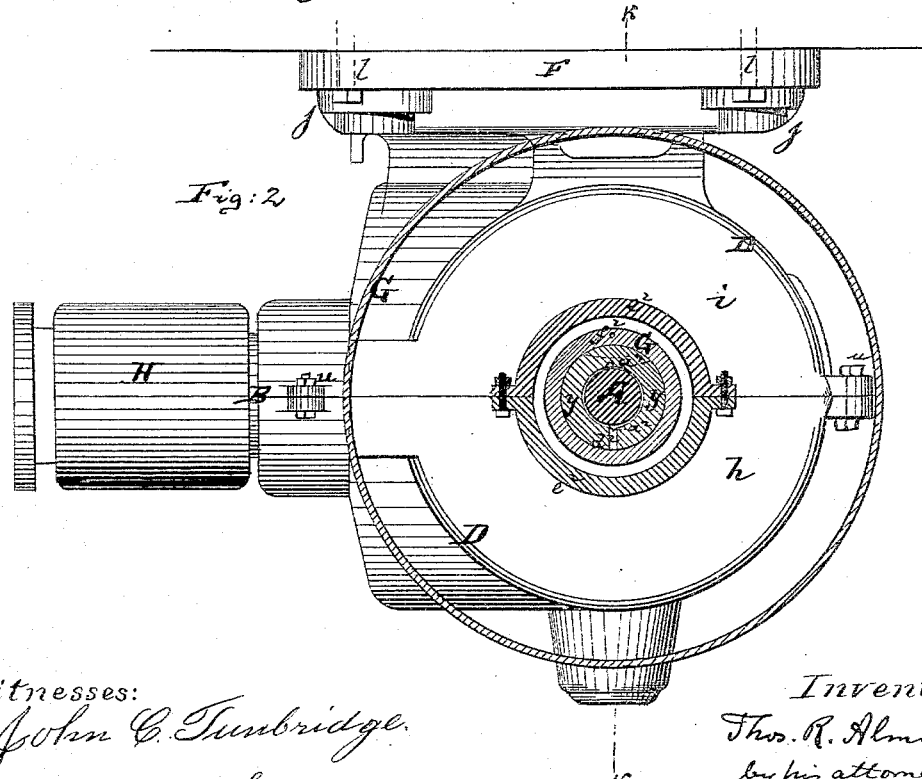
Figure 3:
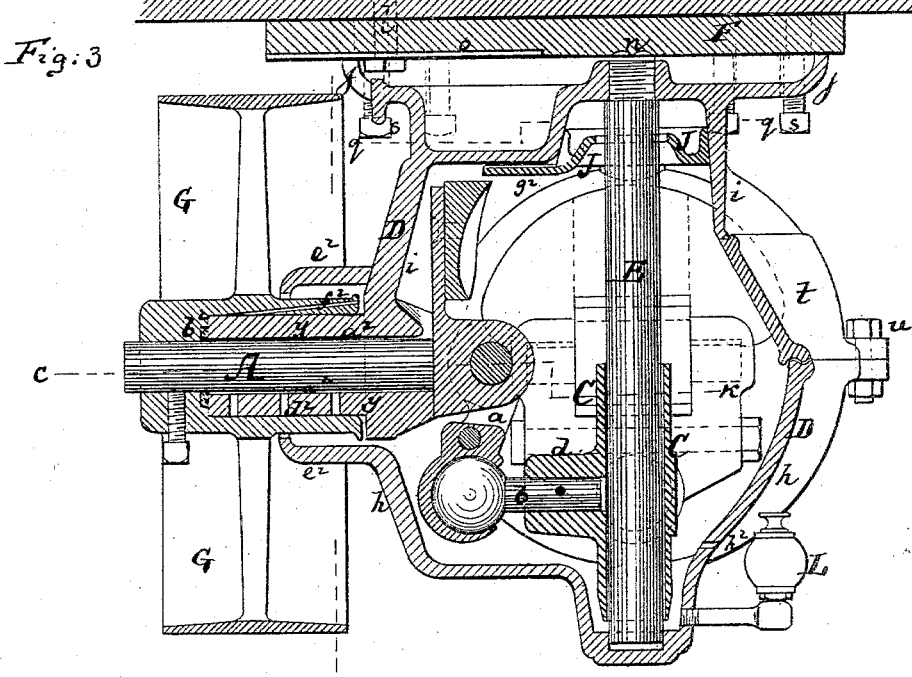
Figure 4:
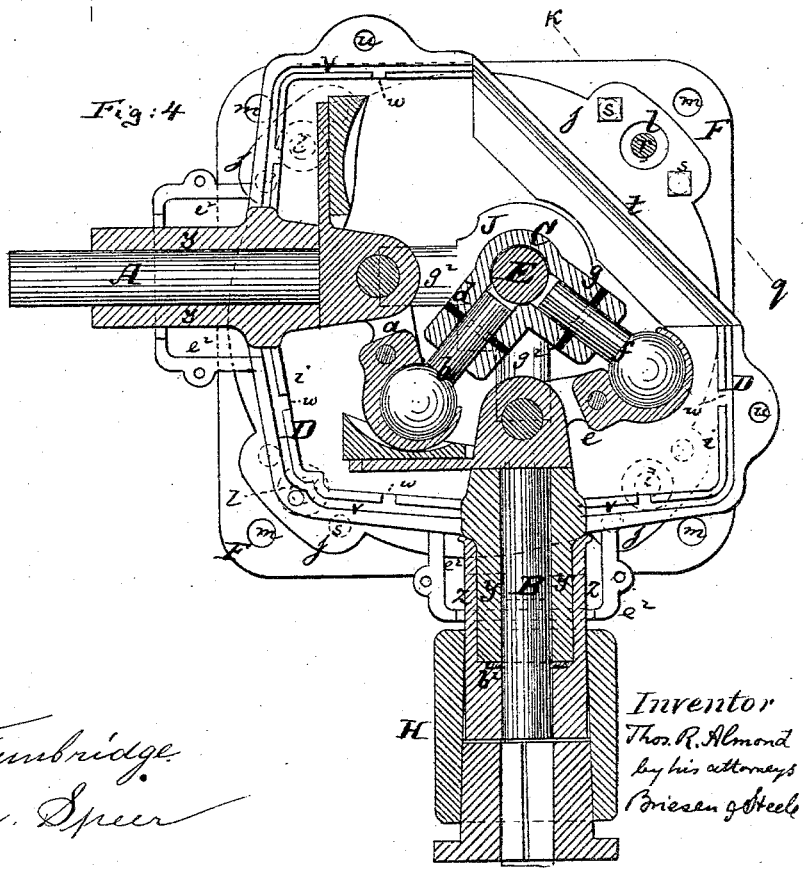
Figure 5:
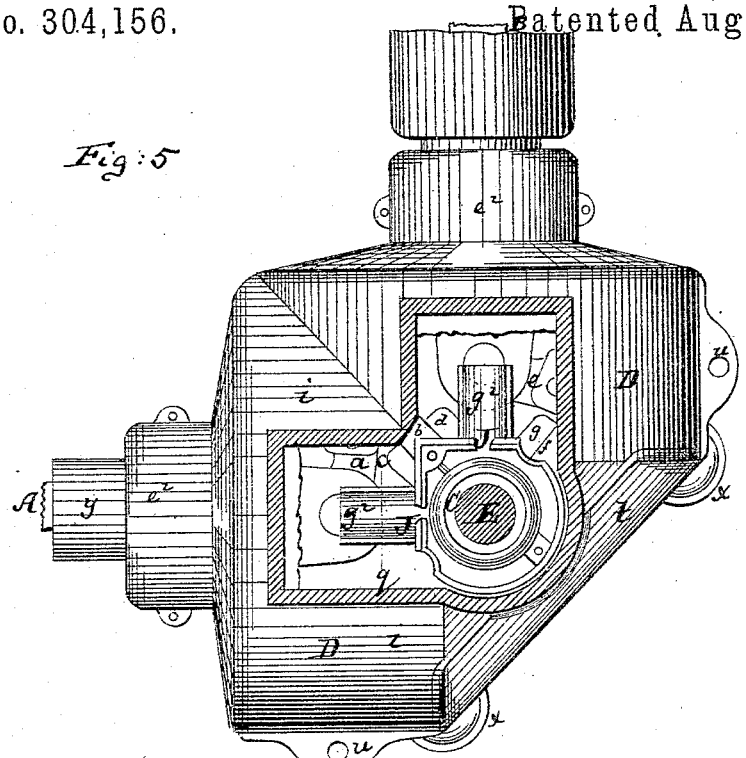
Figure 6:
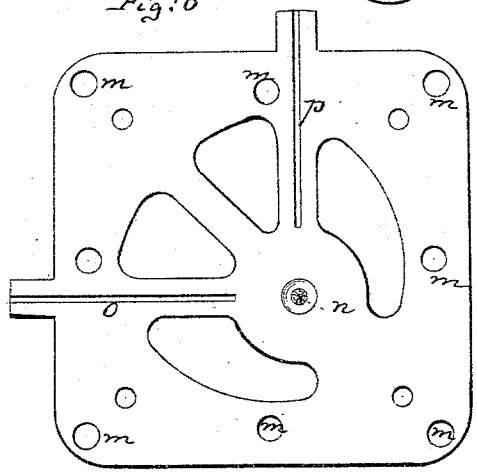
Figure 7:
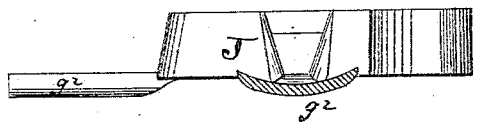
Figure 8:
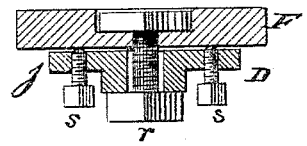

Figure 1 is a side elevation of my improved coupling for shafting. Fig. 2 is a vertical cross-section on the line $c\,c$, Fig. 1. Fig. 3 is a vertical central section of the same on the line $k\,k$, Fig. 2. Fig. 4 is an inverted plan view of the upper part of the same, showing portions of the coupling in section, the line $c\,k$, Fig. 3, indicating the plane of section. Fig. 5 is a plan or top view, partly in section, of the said coupling, the line $q\,q$, Fig. 3, indicating the plane of section. Fig. 6 is an inverted plan view, on a reduced scale, of the top or suspension plate which is used on the apparatus. Fig. 7 is an enlarged side view, partly in section, of the oil-distributing shield which is used in the upper portion of the coupling, the line $c\text{-}q$, Fig. 5, indicating the plane of section. Fig. 8 is a vertical section through the angle of the upper suspension-plate, and of the flange of the coupling-shell which connects therewith, the line $k\,q$, Fig. 4, indicating the plane of section.

This invention relates to certain improvements on the coupling for shafting which is described in the Letters Patent No. 236,474, granted me January 11, 1881.

The object of the invention more particularly is to prevent the coupling running dry—in other words, to keep all its parts properly lubricated at all times. Another object is to facilitate the placing or suspension of the coupling in such a manner that it can be readily adapted to existing lines of shafting and adjusted from time to time as may be necessary.

The invention consists, first, in inclosing substantially such a coupling as is described in the above-mentioned Letters Patent in a housing or shell of peculiar kind, which housing is provided with an opening, through which the lubricating matter may be introduced, and access had for other purposes to the interior thereof.

The invention also consists in placing in the upper part of this housing a shield for distributing oil, which is raised to the shield by the vertically-reciprocating sliding tube of the coupling.

The invention also consists in the new construction of upper or suspension plate, which is first secured to the ceiling, and afterward, when in position, adapted to receive the coupling itself, which is secured to it, and to allow of the adjustment thereof.

The invention also consists in providing the housing or shell above referred to with projecting hub-like extensions, that surround the shafts of the coupling and serve as bearings for the pulleys or coupling devices that join the shafts of the coupling to the driving and driven shafts of the outside machinery.

The invention further consists in details of improvement that are hereinafter more clearly pointed out.

In the accompanying drawings, the letter A represents one shaft and the letter B the other shaft, of the coupling. These shafts are hung at a suitable angle, preferably in the same plane and at a right angle to one another in the housing or shell D, which is suspended from the ceiling of a room or other suitable framing. The shaft A has a crank, $a$, to which is fitted by ball-joint an arm, $b$, which connects with the arm $d$ of the sliding tube C. The shaft B has a similar crank, $e$, in which is fitted by ball-joint an arm, $f$, which connects with the arm $g$ of said sliding tube C. All these parts, excepting the housing D, are of substantially the construction of the coupling referred to by the same letters of reference in said Letters Patent No. 236,474. The housing D, which furnishes the bearings for the shafts A B, contains, also, the upright central post, E, which is embraced by the sliding tube C. The post E is held at its upper and lower ends in the said housing, as appears clearly from Fig. 3 of the drawings. The housing itself is made in two halves or parts, $h$ and $i$. The upper part, $i$, (which is separated from the lower part, $h$, the line of division being substantially in the same plane with the axes of the shafts A B,) has its upper portion provided with an outwardly-projecting flange, $j$, through which are passed the bolts

*l*, which unite the housing to the suspension-plate or top plate, F, of the apparatus. The said top plate, F, of which an inverted plan view is shown in Fig. 6 of the drawings, is of suitable outline and size, and is provided with bolt-holes *m* for receiving the bolts, by which it can be attached to the ceiling or other support. The under side of this plate F should be marked with the angle and direction of the shafts A B of the coupling that is to be suspended from it, and also with the center line of the sliding tube C of such coupling. Thus, in Fig. 6 the dot *n* indicates the point which is to be centrally above the axis of said tube C, and the grooves or lines *o* and *p* indicate, respectively, the direction of the shafts A and B. The plate F thus marked will afterwards facilitate the proper disposition of the parts of the coupling with reference to the direction of the shafts and position of post E and sliding tube C. In other words, if the shaft to be driven and the driving-shaft of the outside machinery are already in position, it will be far more convenient to properly ascertain the position of the coupling-shafts by plumbing from the plate F, that has been marked as stated, than it would be if such a preliminarily-gaged templet were not provided.

The bolts *r*, by which the housing D is fastened to the plate F, have their heads, by preference, sunk in the recesses that are formed in the upper face of the plate F, as is very clearly shown in Fig. 8 of the drawing. The lower parts of these bolts pass through enlarged openings in the flange *j* of the housing, and receive the nuts that bear against the under side of such flange, as is also clearly shown in Fig. 8. The holes in the flange *j* for the reception of these bolts *r* are made larger than the bolts, so that the housing may be more or less adjusted horizontally on the fixed plate F. Set-screws *s* pass through the flange *j*, and bear against the under side of the plate F, for the purpose of regulating, more or less, the position vertically of the housing, or of any part thereof. In other words, the level of the housing may, with the assistance of these set-screws *s*, be made to differ slightly from that of the plate F, if such difference be necessary. The upper part, *i*, of the housing D is connected to the lower part, *h*, of said housing by suitable bolts *u*, which pass through contiguous lugs that are formed on said halves, respectively. In the upper part, *i*, of said housing is an opening, which can be closed by a door, *t*, which door is made removable; and through this opening access may be had to the coupling itself, for the purposes of inspection and of lubrication. This door is shown from below in Fig. 4, in cross-section in Fig. 3, and in outside view in Figs. 1 and 5. The contiguous edges of the parts *h i* of the housing should be so constructed that oil, which by the means hereinafter stated, is thrown against the inner facing of the housing, may not pass out through the joint. For this purpose said faces should be grooved, as indicated at *v* in Fig. 4, the groove or channel thus formed having passages *w*, which lead into the interior of the housing. These grooves or channels will intercept any oil that may enter the joint of the housing, and lead such oil through the passages *w* back into the interior of the housing. Any oil which may after all find its way through the joint of the housing or through any other crevice or passage—for example, along the edge of the door or otherwise—can still be collected in cup-like or channel-like receptacles *x*, which are affixed face upward to the lower part, *h*, of the housing, as indicated in Fig. 5. These receptacles may be continuous around the housing or along either face thereof, wherever they may be needed to prevent the escape of oil.

The upper part of the housing has formed on it the projecting hub-like extension *y*, in which the shafts A B have their bearings, as appears clearly in Figs. 3 and 4 of the drawings. These bearings serve the purpose not only of securely holding said shafts A B of the coupling, but also of sustaining on their outer peripheries the mechanism that is to connect externally with said shafts. Thus in Fig. 3 a pulley, G, is shown to connect with the shaft A, and to have its hub so shaped that it embraces the extension *y* or bearing part of the housing inside of the point where it is connected with the shaft A. It follows that this pulley G, when revolving, will not strain the shaft A materially, as nearly the whole strain of the belt-pressure will be transmitted from the hub of the pulley to the bearing *y* of the fixed housing. In like manner the lower part of Fig. 4 shows the shaft B united by a suitable coupling, H, with an outside shaft, a part *z* of said coupling embracing the bearing *y* of the shaft B, so that should any lateral strain be imparted to this coupling H, or to the shaft which joins it to the shaft B, such lateral strain will be mainly absorbed by the bearing *y* and not transmitted to the shaft B.

I also desire it to be understood that by placing the hub of the wheel G in part around the bearing *y* of the housing and making the outer periphery of the bearing *y* a bearing-surface for said wheel, I virtually enlarge the amount of bearing-surface of the shaft A itself, and increase its durability. The inner face of this bearing *y* has longitudinal grooves $a^2$, which direct the oil lengthwise along the shaft, lubricating the shaft throughout its extent in said bearing. At the end of these longitudinal grooves a packing or elastic washer, $b^2$, is placed against the bearing *y*, as shown. This packing prevents the oil flowing farther in the direction of the length of the shaft A.

Through the lower part of the bearing *y* extend three (more or less) oil-channels, $d^2$, which convey the oil from the shaft A to the outer periphery of the bearing *y*, and lubricate, therefore, the inner bearing of the hub of the wheel G or other device that may be made to embrace said bearing. Whatever oil is thus used for lubricating said wheel G or its equivalent will finally pass out along the inner end of the hub of the wheel G, and will thence drop or fly off from such inner end of said hub, which may be enlarged for this purpose, as shown, into the housing. In order to catch the oil which may fly off the said hub above or at the sides of the bearing $y$, a shield, $e^2$, extends from the housing part way around the hub of the wheel G, as is clearly shown in Figs. 3 and 4 of the drawings, thus forming an annular receptacle for the oil thus discharged from the hub of the wheel G, which receptacle communicates at its lower part with the interior of the housing, as also appears from Fig. 3. The hub of the wheel G or its equivalent is also perforated in substantially longitudinal manner, as is shown in Fig. 3—that is to say, provided with an air-passage, $f^2$, which reaches contact with the outer side of the bearing $y$, and serves the purpose of permitting air to escape from the places that are to be reached by the oil. Any oil which may perchance also pass through this opening $f^2$ will find its way into the interior of the housing the same as the oil thrown off the hub of the wheel G.

In the upper part of the housing is secured the oil shield or distributer J, which, as appears from Fig. 3 of the drawings, surrounds the post E. The said shield or distributer is secured, by suitable bolts or otherwise, in the housing, and embraces the post E at such a height that the vertically-reciprocating slide C in its most elevated position must enter between said shield and said post and extend above said shield. The said shield, which is shown in plan view in Fig. 5, forms a sort of annular oil-channel, with projecting wings or oil-distributing troughs $g^2$ thereon, which troughs are placed in such directions and are of such extent as to supply the oil to those parts of the coupling which are most likely to require it.

Having now described my invention, I will briefly state the manner in which it operates.

After the coupling has been suspended from the plate F and properly connected with the shafting outside, the door $t$ is opened and oil poured into the housing D until a suitable gage, L, or a suitable vent, $h^2$, shall indicate that it stands at the required height in the housing. The door $t$ is then closed and the machinery set in motion.

The coupling operates as described in my afore-mentioned patent, and during its operation the tube C will be slid up and down, entering, toward the end of its upward stroke, the place above the shield J. During the operation of the mechanism the post E becomes coated with a film of oil, which is applied to it partly by the reciprocating tube C, the lower end of which dips into the collected oil at the bottom of the housing, and partly by the rotating cranks, which throw about drops of oil within the housing. The film of oil which surrounds the upper portion of the post E is by the ascending closely-fitting tube C lifted into the place above the shield J, and as said shield is so constructed that it shall fit closely around the tube C, the oil so lifted by the tube will, when said tube descends, in part be discharged into the annular oil-channel of the shield J, and afterward be distributed by said shield to those parts of the mechanism which may need oiling. Thus in Fig. 5 of the drawing said shield J is represented as provided with two projecting troughs, $g^2$, which lead directly over the pivots of the cranks $a$ and $e$, dropping the oil upon these pivots; but I do not desire to confine myself to this particular arrangement of supply-troughs on the distributing-shield J, as they may be directed to other parts of the mechanism, which experience may teach require special lubrication. As far as the arms $b f$ are concerned, they differ from the pins $b f$, which are described in the above-mentioned patent, in that they are no longer swiveled—at least not necessarily swiveled—in the tubular projections $d g$ of the reciprocating tube C, for I have found that by hinging the cranks $a e$ on the wrist-pins of the shafts A B the necessary motion is obtained, and that hence it is no longer necessary to swivel the connecting links or pieces $b f$ in the tube C. Still I can use all the parts of my present invention in connection with a coupling in which the pins $b f$ would be swiveled in projections of said tube.

I also desire it to be understood that although throughout this specification I have represented the housing as suspended from a ceiling, so that the part $h$ of the housing should be the lower part, nevertheless the structure is equally useful when inverted and attached to a support below it, or when secured to a vertical or other suitable support, which arrangement would still operate in every respect like the mechanism illustrated in the drawings, requiring as modification only such a displacement of the oil-distributing shield J as will always bring it to the upper part of the post E, and a corresponding change in the arrangement of the oil-cups $x$ and perforations $d^2$, which would occur to any mechanic whose duty it would be to secure such a structure in the desired position. Oil thrown about by the revolving cranks $a e$ and their connections will also come in contact with the inner side of the housing D, flowing thence in properly-shaped channels toward the shafts A B, which are thus lubricated.

I claim—

1. In a coupling having shafts A B, which are hung in a housing, D, the combination of said housing with the upper suspension-plate, F, which is secured to the ceiling, and to which said housing is attached, all substantially as described.

2. The top suspension-plate, F, constructed with the marks $n o p$, and adapted to be fastened to a ceiling or other support, for use in combination with a housed coupling, as specified.

3. The combination of the housing D for a coupling, said housing having the flange $j$ at its upper portion, with the plate F, connecting-screws $r$, and set-screws $s$, substantially as and for the purpose described.

4. In a coupling constructed substantially as described, the housing D, made in two parts and combined with the door $t$, which closes an opening in said housing, as set forth.

5. In a coupling substantially as described, the housing D, made in two parts, $h\ i$, and provided with channels or grooves $v$, and inwardly-extending passages $w$ along the contiguous edges of said parts, as specified.

6. The housing D, constructed of the parts $h\ i$, combined with the external oil-receivers, $x$, as described.

7. In combination with the coupling having shafts A B, the housing D, constructed with the extended bearings $y\ y$, in which said shafts are received, substantially as specified.

8. In combination with a coupling having shafts A B, the housing D, having extended bearings $y$, and the wheel G, or its equivalent, arranged to surround said bearing, substantially as specified.

9. The housing D, provided with projecting bearings $y\ y$, which are adapted to receive within them the shafts of the coupling and around them the hubs of the wheels or other devices that are fastened to said shafts, as specified.

10. The combination of the housing D, having extended bearing $y$, with the shaft A of the coupling, wheel G, and shield $e^2$, as described.

11. The housing D, having extended bearing $y$, said bearing containing longitudinal inner channel or channels, $a^2$, and outwardly-extending passages $d^2$, in combination with the shaft A and with the hub of the wheel G, as described.

12. The combination of the shaft A of the coupling with the housing D, having extended bearing $y$, said bearing containing inner channels, $a^2$, and outwardly-extending passage $d^2$, and with the hub of the wheel G, said hub having a passage, $f^2$, as specified.

13. In combination with the coupling having shafts A B, cranks $a\ e$, arms $b\ f$, and reciprocating tube C, the post E, oil-distributing shield J, and housing D, substantially as described.

14. The oil-distributing shield J, constructed with central opening for admitting the closely-fitting tube C, and with the projecting oil-distributing troughs $g^2$, substantially as herein shown and described.

THOMAS R. ALMOND.

Witnesses:
JOHN C. TUNBRIDGE,
WILLY G. E. SCHULTZ.